US006450450B1

(12) United States Patent
MacDonald et al.

(10) Patent No.: US 6,450,450 B1
(45) Date of Patent: Sep. 17, 2002

(54) LOW COST STRUCTURAL FABRICATION THAT RESISTS CATASTROPHIC FAILURE UNDER RAPID THERMAL LOADING

(75) Inventors: Frank D. MacDonald, Ridgecrest, CA (US); Patrick B. Stickler; Ryon C. Warren, both of Seattle, WA (US); Chun-Hua Kathy Chuang, Brecksville, OH (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/709,784

(22) Filed: Nov. 6, 2000

(51) Int. Cl.⁷ .............................. B32B 5/12; B32B 3/02
(52) U.S. Cl. ...................... 244/126; 244/126; 244/133; 244/129.6
(58) Field of Search ................. 244/126, 133, 244/129.6

(56) References Cited

U.S. PATENT DOCUMENTS

| | | | |
|---|---|---|---|
| 4,581,053 A | * | 4/1986 | Prewo et al. |
| 4,613,473 A | * | 9/1986 | Layden et al. |
| 4,631,098 A | * | 12/1986 | Pithouse et al. |
| 4,690,851 A | * | 9/1987 | Auduc et al. |
| 4,898,783 A | * | 2/1990 | McCullough, Jr. et al. . 244/133 |
| 4,902,326 A | * | 2/1990 | Jarmon |
| 5,186,776 A | | 2/1993 | Boyce et al. |
| 5,279,892 A | * | 1/1994 | Baldwin et al. |
| 5,773,122 A | | 6/1998 | Lennox et al. |
| 5,863,846 A | | 1/1999 | Rorabaugh et al. |
| 5,945,166 A | | 8/1999 | Singh et al. |
| 5,985,405 A | * | 11/1999 | Doucette, Jr. et al. |
| 6,013,361 A | | 1/2000 | Seal et al. |
| 6,139,942 A | * | 10/2000 | Hartness et al. ............. 442/61 |
| 6,187,411 B1 | * | 2/2001 | Palmer |
| 6,277,463 B1 | * | 8/2001 | Hamilton et al. ........... 244/133 |

OTHER PUBLICATIONS

U.S. Department of Commerce, Composite Heat Damage. Part 1, Mechanical Testing of IM6/3501–6 Laminates; Part 2, Nondestructive Evaluation Studies of IM6/3501–6 Laminates, May 1990, Springfield, Virginia.

MacDonald, Frank, Patrick Stickler, Kathy Chuang, Scott Coguill, Beyond $T_g$ Characterization of Polymer Matrix Composites Materials for Moderate Duration Applications, Nov. 30, 1999.

Unauthored, White paper report RE: Oak Ridge National Laboratory Sponsered Work Under Contract DE–AC05–84OR21400 Evaluating IM6/3501–6, undated.

Caywood, William C., Robert M. Rivello, & Louis B. Weckesser, Tactical Missile Structures and Materials Technology, John Hopkins APL Technical Digest, 1983, pp. 166–174, vol. 4, No. 3.

* cited by examiner

Primary Examiner—Michael J. Carone
Assistant Examiner—Lulit Semunegus
(74) Attorney, Agent, or Firm—Earl H. Baugher; Laura R. Foster

(57) ABSTRACT

Provided is a fabrication that is simple to make and cost effective in optimizing performance for moderately extended high velocity missions of high performance airborne vehicles. To counter rapid thermal loading while providing a relatively low cost structure, a laminate, in a preferred embodiment an intermediate modulus carbon fiber laminated as fabric layers in a resin matrix, is stitched through with glass fiber material. This laminate is then cured and formed as a section of skin of a supersonic missile, enabling extended supersonic operation, nominally some minutes after the laminate's $T_g$ has been reached or exceeded. Additionally, an airframe and airframe members constructed in accordance with a preferred embodiment of the present invention are disclosed. Compared to existing materials, it reduces cost and weight, increases thermal stability, and maximizes internal payload.

32 Claims, 5 Drawing Sheets

LOW COST STRUCTURAL FABRICATION THAT RESISTS CATASTROPHIC FAILURE UNDER RAPID THERMAL LOADING

FIELD OF THE INVENTION

Pertains to a lightweight inexpensive fabrication that resists catastrophic failure from rapid thermal loading, enabling operation for a moderately extended period after the glass transition temperature, $T_g$, has been reached. Specifically disclosed is a stitched composite panel that may comprise the skin of supersonic or hypersonic airframes.

BACKGROUND

Conventionally, surface skin components of airborne vehicles are fabricated of fiber reinforced plastic (FRP) compositions. These include glass fibers such as E-glass or S-glass, boron, carbon, and aramid fibers, the latter commercially familiar as KEVLAR®. The plastic matrix components of these composites include polyester and epoxy resins, polyimides, polyamides, polybutadiene resins and vinyl ester polymers. These plastic matrix resins are classified either as thermoplastics which can be molded repeatedly upon heating to a temperature at which they soften or thermosets which can be cured by cross-linking at anywhere from ambient to 400°–600° F., through chemical cross-linking, or, for a limited class, cured by light such as ultra-violet (UV).

Where structure is subjected to high rate thermal loading, thermosetting resins are employed in the matrix material. For less severe conditions, thermoplastic resins are employed although thermoset resins are used in most lay-ups.

In forming simple shapes such as flat sheets or rectangular polyhedra, lay-up and bagging techniques are straightforward. For example, Kirk-Othmer, *Encyclopedia of Chemical Technology*, 3$^{rd}$ Edition, 1981, Supplement Volume at pages 268–270, discloses a process for preparing a flat composite product by placing a carbon-fiber-epoxy pre-(resin) impregnated (prepreg) lay-up on a flat tool surface. The lay-up is covered with breather plies and a nylon bag is placed over the breather plies and sealed at its edges to the tool surface. Air is evacuated from the lay-up by pulling a vacuum on the bag. The assembly is placed in an autoclave, heated, and pressurized to cure.

A similar approach is followed in molding three-dimensional composite structures. For example, U.S. Pat. No. 3,962,394, issued to Hall, discloses a tubular mandrel coated with a resin fiber layer and surrounded by a compression sleeve formed of a thin film of nylon or rubber that is perforated with holes and split lengthwise. A layer of absorbent material is placed around the split compression sleeve and this assembly is surrounded by a bladder that is sealed at both ends to the tubular mandrel. The bladder is evacuated in order to cause the compression sleeve to compact the layers and expel trapped air and excess resin from the fiber-resin material through the holes in the compression sleeve.

Typically, 5 to 10 plies of fiber mats are laminated using intervening applications of resins to arrive at the final laminated panel. Conventionally, fibers within each fiber ply are oriented in a plane paralleling the surface of the ply. The fiber ply may be of a continuous strand type as in the case of a filament wound on a molding tool. Alternatively, the fiber material may be formed of a plurality of generally parallel continuous fibers, e.g. in the form of a "unidirectional tape," or it may comprise fibers aligned in a unidirectional manner.

In addition, the fiber mat may take the form of a braided structure in which the fibers extend predominantly along one direction but are woven together, normally to provide an angle between strands, the "braid angle," of about 15°–45°. A fabric in which fibers are interconnected by cross-strands intersecting at 90° is also used. The fiber layers may be in the form of prepregs in which fibers are impregnated with an uncured resin that is later cross-linked, providing the matrix material.

Various procedures are available for forming FRP composites. Fiber layers, are "laid-up" on a forming tool and resin is sprayed on them. Layers are added until the desired thickness is achieved and the resulting "lay-up" is then cured. The lay-up is pressed lightly to uniformly distribute the resin onto the fibers. Further, curing can occur under pressure. Reference Kirk-Othmer, Encyclopedia of Chemical Technology, 3rd Edition, 1981, Vol. 13, pp. 968–978 and Supplement Volume, pp. 260–281.

In some composites, it is desirable that resin material be uniformly applied throughout the thickness of the fiber plies. In others, pronounced layering, i.e., lamination, is desired. For example, U.S. Pat. No. 4,269,884, Fiber Reinforced Multi-Ply Stampable Thermoplastic Sheet, issued to Dellavecchia et al, May 26, 1981 discloses a process of forming a stampable thermoplastic sheet with several discrete layers. In the '884 patent, outer layers are formed of a thermoplastic resin that may contain optionally up to 50% of a filler and up to 45% of nonsiliceous fibers having a length ranging from about 0.01"–0.75". The fibers are oriented in the plane parallel to the surface of the sheet. Below the outer layer, a molten resinous sheet is provided that allows the internal fiber mats to be impregnated by the resin. The fiber mats are supported by an internal screen. The fiber and resin layers pass through rollers that apply pressure of between 1000–1500 psi thus bonding the several layers and impregnating the fibers with the molten resin. The '884 patent prevents migration from one layer to the next, specifically the process prevents migration of the long reinforcing fibers to the outer resinous layer and migration of the short fibers, if present in the outer resin layer, into the reinforcing layer.

U.S. Pat. No. 5,871,604, Forming Fiber Reinforced Composite Product, issued to Hohman, on Feb. 16, 1999 provides improved lay-up methods wherein layers of fibrous reinforcing material and unset resinous matrix material are first interleaved. The matrix material is formed of unset resin and short reinforcing fibers with an average particle length of 0.2–0.6 mm. The fibers provide a weight ratio of short fibers-to-resin within the range 0.4–1. The reinforcing fibers are longer than the short fibers in the matrix material, ranging from 3 cm to the actual length of the final product. The fiber and matrix layers are integrated in order to cause the resin and short fibers that comprise the strengthened matrix material to enter the interstitial space of the longer reinforcing fibers.

As alternate fiber and matrix layers are built up, a pressure gradient is established from the outside of the built up layers to the forming surface that causes the resin to flow across the interfacial boundaries of the resin and fiber layers. This flow across the resin matrix-fiber interface promotes orientation of the short fibers in a direction across the interfaces so that the short fibers enter the interstitial spaces between the reinforcing fibers. After buildup, the resin is solidified, producing the FRP composite.

At speeds of Mach 3$^+$, the free flight temperature profile (in the atmosphere) drives the design of the "skin" of an airframe such as may be used for a missile. Several design alternatives are available to address the "moderate" peak temperatures expected, i.e., >800° F. for ~15 minutes. Conventional designs use an ablative layer, such as cork, that carries no structural load but increases weight, bulk, and reduces payload for the same external dimensions that would be used for a subsonic design. To achieve an ablative material that would also minimize the loss of payload and other performance parameters, specialized costly materials requiring high cost secondary manufacturing processes have been proposed as one solution. One alternative that also addresses cost is to "adjust" the strength of a composite matrix to enable it to operate at or above the $T_g$ of its major component(s) for short periods, i.e., minutes as opposed to hours, with a nominal operational window of 15 minutes.

The composites soften at their $T_g$ so that if they are being used as a load-bearing member, they need to be "stiffened" to permit use at or above their $T_g$, even for short durations. Conventional means for stiffening have some or all of the above limitations, i.e., they: a) add weight, b) require expensive secondary manufacturing, and c) take up "payload volume." At least two mechanical approaches to circumvent these disadvantages and meet performance requirements have been considered.

The first approach was to increase the thickness of the composite. Assuming a linear response to rapid thermal loading, doubling the missile's skin thickness would yield twice the structural integrity during a nominal 15-minute mission duration. Preliminary thermal expansion evaluations showed that in a typical mission the composite reaches a soak temperature in just over 2 minutes. Thus, depending on the duration and gradient, increasing skin thickness alone may not enable the missile to meet performance limits at the end of a 15-minute mission. Further, doubling the skin thickness adds weight while reducing both payload volume and mass.

The second approach is to provide internal structure for support of the "softened" skin. A disadvantage of this approach lies in the torsional stress that is related to the sectional distance from the missile centerline, mathematically represented as:

$$\tau_{max} = \frac{Tc}{J} \quad (1)$$

where:

$\tau_{max}$=torsional stress

T=resisting torque c=distance from centerline

J=polar moment of inertia and since the polar moment of inertia for a hollow cylinder in the plastic range reduces to:

$$J \approx 2\pi c^3 t \quad (2)$$

the torsional stiffness decreases significantly as the load-carrying capacity of the skin is degraded by the softening of the composite at temperatures at or above its $T_g$. In addition, this approach violates any attempt at reducing cost while maintaining performance, to wit, it: a) adds weight, b) reduces internal (payload) volume, and c) increases complexity and cost of fabrication.

Other approaches join dissimilar materials using conventional methods, e.g., a laminated multi-material composite employing epoxy adhesives, to enable a structure to meet high G-forces. An inherent problem in this approach is the high thermal gradient exhibited across dissimilar materials' boundary(ies) during a typical 15-minute mission. This contributes to "peeling" or de-lamination of the resultant structure.

Low cost composite materials investigated for possible use at temperatures at or above their $T_g$ for a "moderately extended" duration (nominally extended from 3 minutes to 15 minutes) include: Graphite-reinforced (GR) epoxy (EP), sometimes referred to as carbon fiber reinforced (CR) epoxy and hereinafter referred to as GR, GR-BMI, and GR-polyimides such as the NASA-developed DMBZ-15. Providing a means to use these materials for the short duration (~15 minutes) of a Mach 3+ missile's flight substantially reduces the missile's fabrication cost, while reducing weight and maintaining other performance factors. An example application may be an epoxy with a $T_g$ of 350° F. enduring operational temperatures of 700° F. for as much as 5 minutes. Evaluation of the graphite composite, IM6/3501–6, by Martin Marietta Energy, demonstrated a reduction in compressive strength of 60% when held at 650° F. for 30 minutes and 74% when held at 750° F. for 10 minutes. Frame, B. J., Janke, C. J., Simpson, W. A., Ziegler, R. E., Philpot, H. E., Composite Heat Damage, Part 1, Mechanical Testing of IM6/3501–6 Laminates and Part 2, Nondestructive Evaluation Studies of IM6/3501–6 Laminates, ORNL/ATD-33, Oak Ridge National Laboratory, (1990), incorporated herein by reference. Note that the heat buildup in these tests may have been very gradual, unlike the rapid buildup experienced during the flight of a Mach 3+ missile. With this latter consideration in mind and based on these results, a possible design goal for a polyimide-based composite with a $T_g$ of 800° F. may be operation at 1600° F. for a maximum of 15 minutes.

The use of a polymer composite beyond the composite's glass transition temperature, $T_g$, has been successfully demonstrated on missile dome nose tips. For example, the nose tip for the HARM missile is fabricated of quartz polyimide and is used beyond its $T_g$ for about one minute. Other applications exist, all of which operate at or just above their $T_g$ for ≤3 minutes. See William Caywood, Robert M. Rivello and Louis B. Weckesser, "Tactical Missile Structures and Materials Technology," *Johns Hopkins APL Technical Digest*, Vol.4, No. 3, 1983, pp. 166–174, incorporated herein by reference.

Very little data are available for missile flight times exceeding the designed maximum of 3 minutes for a typical tactical engagement. Further, test data are sparse for systems operating at a high heating rate, with or without a long flight time. For long missile flights or high heating rates, or both, investigation into different materials and fabrication methods was done. Consequently, the manufacture, and method of fabricating the manufacture, that forms the nucleus of a preferred embodiment of the present invention was developed.

Results for various conditions to which unstitched ⅛" thick laminated panels composed of the carbon fiber IM7 (an intermediate modulus carbon fiber in an epoxy matrix) and high performance carbon fiber AS4 were exposed (held at 15 minutes after rapid heating of >100° C. (180° F.)/min. up to 1000° F.) are presented in Table 1. Note that performance limits, i.e., $T_g$'s, of the tested materials are as follows: epoxies 350° F., bismalemiedes (BMI) 450° F., and polyimides 450–800° F. The operating range for these materials is normally limited to 50° C. (90° F.) below their $T_g$.

Results indicate that rapidly taking the panel to more than 100° F. above its $T_g$ always results in either de-lamination or catastrophic failure in a short time, i.e., <15 minutes and generally <10 minutes. See also, U.S. Pat. No. 6,013,361, High Performance Structural Laminate Composite Material for Use to 1000° F. and Above, Apparatus for and Method of Manufacturing Same, and Articles Made with Same, issued to Seal et al, Jan. 11, 2000, in which a unique pre-processing procedure dries the constituent materials, thus preventing de-lamination of the resultant composite lamination due to the "confined" outgassing of water vapor upon later application of high thermal loads during installed system operation. Further, under high thermal loading, i.e., above 800° F., de-lamination occurred below the theoretical $T_g$ in one case. The opposite occurred at temperatures below 500° F. with the structure remaining intact at a temperature 100° F. above the theoretical $T_g$ of 350° F. This temperature range, i.e., below 500° F., is much below that expected for a missile operating at Mach 3+ for even moderately extended periods of 10–15 minutes, however.

TABLE 1

| Panel ⅛" thick | $T_g$ (° F.) | Exposure (° F.) | Conditions | Result |
| --- | --- | --- | --- | --- |
| IM7/DMBZ-15 | 800 | 1000 | ambient air | catastrophic delamination @ ~950° F. |
| IM7/DMBZ-15 | 800 | 750 | ambient air | de-laminated after 9 minutes |
| IM7/DMBZ-15 | 800 | 550 | nitrogen | remained intact* |
| IM7/DMBZ-15 | 800 | 650 | nitrogen | remained intact |
| IM7/5250-A | 550 | 550 | ambient air | de-laminated after 13 minutes |
| IM7/5250 (BMI-1) | 550 | 550 | nitrogen | remained intact |
| IM7/8552-A | 350 | 350 | ambient air | remained intact |
| IM7/8552-1 | 350 | 450 | ambient air | remained intact |
| IM7/8552-2 | 350 | 550 | nitrogen | de-laminated |

*Note: "Remained intact" is not necessarily an indication that the material would have performed satisfactorily during an actual mission.

To address these mission-induced thermal loads, existing approaches use ablators and expensive secondary manufacturing processes, such as elevated post-cure temperatures. The post-cure process weakens most polymers while ablators add weight and reduce usable internal volume. Thus existing solutions add both weight and cost to the final design while reducing performance, an unacceptable burden that is addressed by a preferred embodiment of the present invention. There are two basic structures used in fabricating composite panels for use in the aerospace industry, the "sandwich" and the built-up laminate.

Composite sandwich structures incorporate fiber reinforced resin matrix skins or face sheets adhered to a honeycomb or foam core. Conventional face sheets are organic matrix resin composites of fiberglass, carbon, ceramic, or graphite reinforcing fibers and a thermosetting or thermoplastic matrix resin. The face sheets carry loads normal to the surface while the core carries shear loads. That is, the face sheets carry the applied loads and the core transfers the load from one face sheet to the other, or absorbs a portion of the applied load, so that all layers must remain rigidly connected.

Differences in the coefficient of thermal expansion (CTE) of material layers may lead to "peeling," i.e., separation or de-lamination of the sandwich. Thus, as temperatures cycle, one layer may expand or contract more quickly than an adjoining layer. In addition to causing layer separation, CTE differences can significantly distort the shape of a structure.

Conventional sandwich structures are optimized so that the dimension of the structure meets the mass limits for a specific application. Sandwich structures are desirable because they are usually lighter than solid metal or composite counterparts, but they may be undesirable if they must be larger or thicker to achieve the same structural performance. Providing pass-throughs (i.e. holes), relatively easy in a solid metal structure, is difficult in a sandwich structure because holes may significantly reduce its load carrying capability.

A type of sandwich structure using only one "slice" on its exterior, i.e., an "open-face sandwich," is disclosed in U.S. Pat. No. 5,985,405, Three Dimensionally Reinforced Ablative/Insulative Composite, issued to Doucette et al, Nov. 16, 1999. An ablative layer is chemically bound to an insulating layer and further secured with stitches of a heat-resistant thread penetrating the ablative layer and forming loops within the interior of the insulative layer. This arrangement serves to strengthen the bond between the layers and resist de-lamination. The thread loops are bound both physically and chemically within the insulative layer. Note that the thread does not pass completely through both the ablative and the insulative layers and that the insulative layer combined with the ablative layer yields a relatively thick skin, leaving less internal volume for payload than a design using a built-up lamination. Additionally, note that the material through which the stitching passes completely, i.e., the "ablative" material, is resistant to very high temperatures, i.e.,2000–5000° F., depending on whether it is a non-ballistic or ballistic design. The ablative is designed to erode during those portions of the mission in which high thermal loading is experienced, i.e., at much higher than the nominal 1000–1500° F. expected of a short (<30 minute) supersonic missile engagement. Further, the ablative layer is generally denser, thicker, and therefore heavier than would be practical for an expendable low cost supersonic missile of even moderate payload.

Composites incorporating built-up laminates, e.g., laminated plies of fabric in a resin matrix, provide a high strength-to-weight ratio. Bolts or rivets may attach one composite part to another but such fasteners add weight, increase fabrication cost, and often contribute to local failure modes.

Many structural composites, such as airframes, consist of multiple stiffeners. The stiffeners supply rigidity and stiffness that is required under certain flight load conditions. One typical stiffener is a mechanical fastener, such as a hat stiffener. Hat stiffeners, named for their shape, are typically applied to aerospace structural composite components via their skin.

One process for fabricating hat stiffeners is to co-cure the hat to the skin of the structural composite material concurrently with the curing of the structural composite material itself. Another process for fabricating hat stiffeners is to bolt (mechanically and secondarily) or adhesively bond the stiffener to the skin. The failure mode for both these processes occurs at the inner hat-to-skin surface.

In order to address these failures while reducing fabrication costs and increasing stiffness, z-pinning is used. Z-pinning applies reinforcing fibers along the Z-axis through the same plane (or at an angle, such as 45°) in which the composite's fibers lie, i.e., the X-Y plane of the standard X-Y-Z orthogonal axes facilitating the mathematical representation of a three dimensional object. The stiffeners are usually pinned in the Z-direction (perpendicular to the X-Y plane) with large pinning fibers, such as boron, and are typically imbedded in TEFLON®.

In one method, Z-pinning consists of first softening the composite stiffener and skin with heat and then driving fibers through the skin using a press. Since numerous fibers are forced into the skin at once, pressure needed to insert the fibers covering large areas at once must be done hydraulically. In another method, Z-pinning consists of forcing individual fibers through the skin one at a time. The fibers are forced into the skin with an ultrasonic device. See U.S. Pat. No. 5,186,776, Composite Laminate Translaminar Reinforcement Apparatus and Method, issued to Boyce et al, Feb. 16, 1993, describing an ultrasonic needle that penetrates the laminate, moving the laminate fibers aside. The needle is withdrawn and a pin inserted, or the pin is fed through the needle prior to its removal, thus inserting a Z-direction reinforcing fiber into the laminate.

U.S. Pat. No. 5,736,222, Interlaced Z-Pin Structures, issued to Childress, Apr. 7, 1998, discloses Z-pinned composite sandwich structures having angled pins in interlaced configurations. Incorporating Z-pins yields better crack resistance especially around stress concentrators such as bolts or through fasteners.

Composite aircraft stiffeners are used to reinforce thin composite structures such as wing and fuselage skins and bulkhead webs. The stiffener attachments must transfer shear loads from the skin to the stiffener, as well as out-of-plane loads due to peel (de-lamination) forces and frame attachments. The stiffener flange is generally tapered in thickness to minimize stress concentrations and to transfer loads from the stiffener to the skin. Conventionally, bonding of the stiffener to the skin is by a co-cure, adhesive, or mechanical fastener. The co-curing and adhesive bonding add minimum weight, but also have minimum reliability. Mechanically fastened joints require that the laminate be reinforced while adding the weight and expense of installation and inspection. A modern approach addressing some of these concerns is found in U.S. Pat. No. 5,827,283, Stiffener Reinforced Assembly and Method of Manufacturing Same, issued to Campbell et al, Oct. 27, 1998. It discloses a stiffener reinforced assembly in which reinforcing pins are inserted through the stiffener at the radius region of the stiffener and into the skin material to increase load capacity of the joint between the stiffener and the skin material.

There are now available cost-effective tools and methods for applying z-pinning to production lots. See U.S. Pat. No. 6,049,970, Z-Fiber Pinning Tool, issued to Reis et al, Apr. 18, 2000, describing a tool and method for applying fiber structural stiffeners, such as z-pins. The tool inserts a plurality of fibers embedded in a transfer material through a hat stiffener and into a substrate.

Cost is important in the design equation of new weapons systems. A major component of the cost is labor costed in three areas:

initially fabricating the tooling for the parts and fabricating the parts from this tooling;

finishing the parts after removal from the initial fabrication operation; and assembling the parts into the final product.

Any approach that reduces the steps in accomplishing the above, e.g., combining finishing and initial fabrication, significantly reduces final cost. Using missile production as an example, at least 30% is saved in fabrication and finishing costs through substitution of a co-cured composite for an aluminum casting. However, use of composites alone in high performance applications, e.g., above Mach 3 for extended flight times, leads to catastrophic failure of those very composites that are most desirable for use based on their strength-to-weight ratio and cost.

Tests of supersonic airframes show that for flights longer than the typical tactical engagement maximums of 1–3 minutes, existing composite material used for missile panels deteriorated unacceptably. One such composite, DMBZ-15, is part of a new class of thermosetting polyimides based on 2,2'-dimethylbenzidine (DMBZ). For example, a NASA DMBZ-15 ⅛" thick laminated coupon, chosen because of its relatively high $T_g$ of 800° F., catastrophically failed at 967° F. after only 6 minutes of heating. It exploded with a loud bang and much smoke. It was surmised that water contained within the laminations was the cause so a second coupon was dried and tested. The result was the same with failure occurring at 979° F., with similar noise and smoke. The resultant de-lamination is shown in FIG. 5.

Decomposition was postulated to be caused by outgassing of CO and $CO_2$ that could not diffuse through the material in response to rapid temperature increases. As is well known, all polymers would exhibit a softening when heated rapidly to beyond their $T_g$, but catastrophic failure was not suspected. Although CO and $CO_2$ scavenging additives for the resin were considered for preventing the buildup of CO and $CO_2$ gasses internally, investigation indicated that additives would be more detrimental than helpful, hence stitching perpendicular to the X-Y plane in which the material lies, i.e., the Z-plane, was pursued. Tests suggest that such stitching provides both a path for ready outgassing as well as improved structural strength in the transverse direction. Stitching through a composite laminate prior to saturating the laminations in an adhesive, such as epoxy, if the composite was not fabricated with a plastic matrix material, reduced de-lamination as demonstrated in tests simulating the rapidly induced thermal loads experienced on the skin of Mach 3⁺ missiles. Frame, B. J. et al, supra.

SUMMARY OF THE INVENTION

Structural designs enabling a composite laminate panel to withstand high operating temperatures and methods for fabricating these panels are presented. For general rapid thermal loading applications, a structural member is provided that accommodates high rate thermal and G-force loading for a time beyond that moment at which the glass transition temperature, $T_g$, of at least one constituent of said member is reached. It may be built from:

a thin laminate of composite material having a relatively high $T_g$, nominally >550° F. (but for reduced thermal loading, composites using room temperature cures and having $T_g$'s of tens of degrees F may also be used) and a high temperature resistant material compatible with the composite material and suitable for use as a thread for stitching through the thickness of the thin composite material.

The stitching provides avenues for outgassing of at least some of the composite material's constituent compounds during high rate thermal loading of the member.

Additionally disclosed is a method for fabricating a structural panel using the above components as well as an airframe and a high-speed vehicle utilizing the panel and the airframe as a constituent component.

A typical embodiment enables a composite panel to withstand a heating load of 2.15 BTU/ft²/sec for ~15 minutes. See FIG. 1 in which a ⅛" thick coupon was subjected to heating at this rate and data taken 101 was compared to data taken from a flight test 102 of a rocket with a ⅛" skin launched at 30,000 ft, Mach 4.75, apogee 69,000 ft.

Referring to FIG. 2, a preferred embodiment of the present invention, a composite panel 201, is "stitched" through its thickness 202 with a suitable "thread" 203. This yields a laminate 204 consisting of a series of lamina 205 that are stitched through. If the composite material does not incorporate a thermosetting plastic matrix, the stitching is done just prior to saturation of the layers of fabric with a suitable resin, such as epoxy. A stitching fiber suitable for operations at expected temperatures is used. Typically, a glass fiber is needed for temperatures expected to exceed 450° F.

The composite material (fabric) may consist of carbon fibers embedded in a plastic matrix, such as the commercially available IM7. Of course, this material is stitched through as received since the thermosetting plastic matrix is already part of its structure. This "through-the-thickness" reinforcement of a composite panel improves performance during elevated temperatures for moderate exposure periods, viz., rapid heating and hold for 15 minutes as tested, preventing the catastrophic failure previously observed as referenced above. Table 2 summarizes test results for a preferred embodiment held at 15 minutes after rapid heating.

TABLE 2

| Panel (thickness, inches) | $T_g$ (° F.) | Exposure (° F.) | Conditions | Result |
|---|---|---|---|---|
| AS4/5250 (0.285") nylon stitching | 550 | 650 | ambient air | remained intact but nylon stitches melted |
| AS4/3501-6 (0.25") KEVLAR ® stitching | 350 | 450, 550 | ambient air, nitrogen | remained intact |
| IM7/DMBZ-15 (0.125") 1029-001-FI-A glass fiber stitching | 800 | 1000 | ambient air | charred uncut |
| IM7/DMBZ-15 (0.125") FI-004-A glass fiber stitching | 800 | 1000 | ambient air | charred |
| IM7/8552-01 (0.125") glass fiber stitching | 350 | 450 | ambient air | remained intact |
| IM7/5250-04 (0.125") glass fiber stitching | 550 | 550 | ambient air | remained intact |
| IM7/DMBZ-15 (0.125") 1029-002-FI-2A glass fiber stitching | 800 | 800 | ambient air | remained intact although exhibited crackling sounds during cooling |
| IM7/8552-02 (0.125") glass fiber stitching | 350 | 550 | ambient air | remained intact |
| IM7/5250-04-02 (0.125") glass fiber stitching | 550 | 650 | ambient air | remained intact although exhibited crackling sounds during cooling |

Applications of a preferred embodiment of the present invention are not limited to supersonic platforms. For example, in specific locations on subsonic platforms, high heat buildup on a cyclical basis leads to premature failure and early replacement. Areas around jet exhausts are prime candidates, the exhaust area of an AV-8B Harrier, a Vertical Short Takeoff and Landing (VSTOL) aircraft, being a prime candidate for this technology.

Embodiments of the present invention can be applied to any system that must operate in an undegraded mode for moderately extended periods under high thermal loads in order to meet performance goals. This may include high performance airframes used for either commercial or military purposes. An embodiment, as well as its method of fabrication, provides a high performance light weight supersonic or hypersonic platform at reduced cost when compared to specialized platforms capable of its airframe weight/payload performance ratio. Although much work has been done to develop a structure and materials for resisting structural deformation due to high rate thermal loading, none has addressed the need for both a low cost and light weight solution to the extended mission requirements being placed on modern weapons as is done in the present invention.

Advantages of a preferred embodiment of the present invention include:

prevents catastrophic failure in specific mission roles requiring operation at or beyond the $T_g$ of material components for moderately extended periods;

significant reduction in cost of fabrication;

increased performance;

reduced weight;

increased interior volume available;

fewer fabrication steps;

reduced life cycle costs;

fewer design tradeoff considerations;

increased flexibility in pursuing system design options; and increased reliability.

Preferred embodiments are fully disclosed below, albeit without placing limitations thereon.

DETAILED DESCRIPTION OF THE INVENTION

Figure 1:
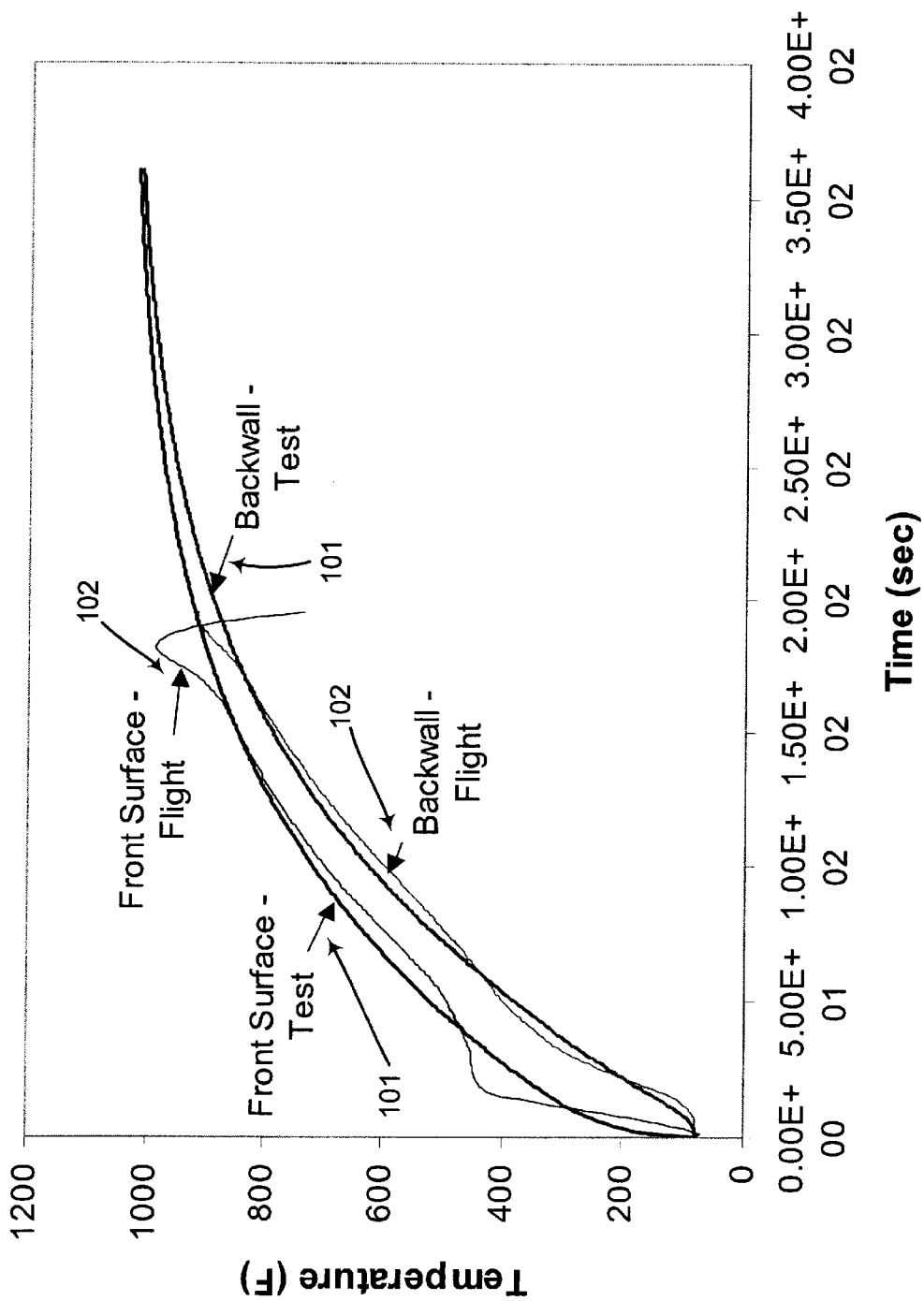
FIG. 1 shows the relation between temperature and time for a preferred embodiment of the present invention under flight test compared to a test coupon laminate.

A thin, lightweight, heat resistant, composite structure, and method for its fabrication, is provided. A preferred embodiment of the present invention prevents catastrophic de-lamination due to CO and $CO_2$ and water vapor outgassing under high heating rates (e.g., >1800 F/min) for temperatures exceeding $T_g$ of current high performance polyimides (e.g., 800° F.) even when the laminated panel has been exposed to high humidity (e.g., >85%). The composite material preferably has a $T_g$ of greater than 0° F., more preferably a $T_g$ of greater than 200° F., and most preferably a $T_g$ of greater than 550° F. Specifically, a heat resistant structural member provides the strength, low density, and reduced thickness necessary to provide a suitable "skin" for a vehicle operated for moderately extended flight times at supersonic or hypersonic velocity, such as a high-performance missile. Weight and bulk are saved by providing "stitching" through layers of thin composite material (fabric) in a plastic thermoset matrix, i.e., a laminate, that would not otherwise have the strength, thermal performance, or reduced bulk to provide a structural skin for a high performance vehicle with optimum internal payload capacity. The "thread" used for the stitching can be any of a number of materials such as, but not limited to: fiberglass, KEVLAR®, or polyester, with a preferred material being a glass fiber. Increased payload results from more available interior volume since a thinner skin can be fabricated with a preferred embodiment of the present invention.

Several materials were investigated as possible candidates for fabrication of the laminates used to develop a thermally resistant structure capable of supersonic flights up to 30-minutes duration: epoxies, bismaleimide monomers (BMI), polyimides, cyanate ester resins, polyethylene terephthalates (PET) such as PET 15, and clay laminates. Subsequently these were narrowed to the graphite-reinforced (GR) versions of the epoxies (EP), BMI, and polyimides. In addition to thermal loading, a preferred embodiment of the present invention is subject to dominant stresses arising from oxidation, moisture, and the response of the vehicle, both dynamic and static, e.g., response to high-G maneuvers and acceleration.

A fabric-based lightweight, high-strength, intermediate modulus reinforced laminate, as defined herein, comprises one or more layers of a fabric, or fabrics, stitched through their thickness, having a material-dependent thermal, shear, and compressive force response and a total thickness that will provide structural strength with minimal bulk and weight while employed as "skin" material at supersonic or hypersonic speeds for a moderately extended period. The performance of the laminate is measured in terms of compressive and shear strength loss at peak mission-induced operating temperatures from that available at ambient or room temperature. The laminate will maintain structural integrity through mission completion even as the laminate exceeds its $T_g$ for a period exceeding 15 minutes after reaching $T_g$.

Fabrics capable of performance under these conditions include carbon fiber fabrics, reinforced as described herein, and for example, commercially available under the names IM7 and AS4. Materials suitable for stitching the fabric layers include polyester, KEVLAR®, and glass fiber (or any fiber with a thermal response similar to glass fiber), with the latter preferred for sustained operation above 500° F.

The fabric may be woven, knit, braided, or non-woven. Preferably, the fabric will have a moderate fiber density, and thus contribute to a moderate material density, such that the strength-to-weight ratio of a structure constructed of the laminate will be optimized. Most preferably, the fabric is loosely interleaved in various orientations that may not be identical from layer to layer in the laminate.

The fabric is impregnated with at least one non-fiber, thermally resistant material that is compatible with the fabric. Examples include the cured resins, e.g., phenolic, epoxy, or polyimide, with the polyimide being preferred for applications above 800° F.

The laminate should have a moderate density, usually about 1.1 g/cc or less to optimize strength-to-weight and maximize internal payload. Typically, strength can be improved by increasing the total fabric thickness within the laminate. However, increasing total fabric thickness must be balanced against increased weight added to the vehicle. In a preferred embodiment, to increase fabric thickness in the laminate, multiple layers of fabric are laid up to make a fabric stack or preform. To optimize performance of the resultant laminant at its $T_g$, and beyond, the fabric layers are stitched together (much like stitching multiple fabric layers of a piece of clothing) with a temperature-resistant thread that will not significantly degrade when heated above the $T_g$ of the laminate for a moderately extended period. Examples of suitable temperature resistant threads include carbon and silicon-based (glass) fibers. Most preferably, the fabric layers are lock-stitched through the laminate's entire thickness.

Fabric layers are stitched with a number of stitches per square inch of surface area sufficient to hold fabric layers together and to provide pathways, along the stitch, for the escape of decomposition products that are generated upon exposure of the laminate (panel) to high temperatures, such as are expected in moderately extended supersonic excursions. Otherwise, decomposition gas buildup between fabric layers may result in spallation of the impregnated fabric composite. Typically, fabric layers are lock-stitched together with at least nine stitches per square inch of surface area and more preferably at least sixteen stitches per square inch. Most preferably, the stitches are uniformly spaced.

For suitable performance at supersonic speeds of Mach $3^+$, carbon fabric is preferred since it retains compressive and shear strength at high temperatures per unit of fabric weight. The carbon fabric should have a carbon content that prevents significant thermal degradation of the resultant laminate when exposed to induced temperatures between about 800° and 1600° F. Typically, the carbon content is about 60% by weight (wt %), or more. More preferably, the carbon content is about 65 weight %.

Typically, the total fabric thickness of the resultant reinforced laminate, i.e., that which insures structural integrity at extended supersonic operation above Mach 3+, is between about 0.05 inches and 0.8 inches. Preferably, the total thickness is about 0.10 inches or more. Most preferably, the total laminate thickness is between about 0.125 inches and about 0.50 inches.

The purpose of reinforcing stitches is to provide a plurality of anchor points that are bound mechanically to the outer layers of the resultant laminant thereby providing a three-dimensional reinforcement that is not otherwise only available via the chemical bond provided by the plastic resin between fabric layers as thermally set during cure.

Preferably, the threads also contain a cured thermosetting resin that is compatible with and chemically bound to the cured resin contained in the carbon fabric layers. The number of threads provided must be sufficient to generally prevent de-lamination of layers while under high rate thermal loading induced by supersonic speeds for a moderately extended period, nominally 15 minutes, but possibly further extended to 30 minutes.

Selection of a thread suitable to form stitches is dependent upon the ability of the thread to form stitches without breaking. The ability to form stitches is a function of the bend radius of the thread, bend radius (R) being defined by the equation:

$$R = \frac{E \cdot D}{2\sigma} \qquad (3)$$

where:
E=tensile modulus of the thread
D=filament diameter
σ=filament tensile strength The bend radius should be ≦0:005 inches. Additionally, the thread must have a filament tensile strength sufficient to survive the stitching operation without breaking. Preferably, the filament tensile strength should be ≧600 Ksi.

Carbon thread is the preferred thread when the laminate is carbon-fabric based. The carbon content of the thread must be sufficient to provide dimensional stability and maintain thread strength at operating temperatures up to 500° F.

without material failure. Typically, the carbon content of the thread is ≧85 wt % while preferably, the carbon content is ≧92 wt %. For high temperature operation, i.e., in excess of 550° F., and up to 1600° F., a silicon-containing thread (glass fiber) such as silicon nitride, silicon carbide, or quartz is preferred.

Figure 2:
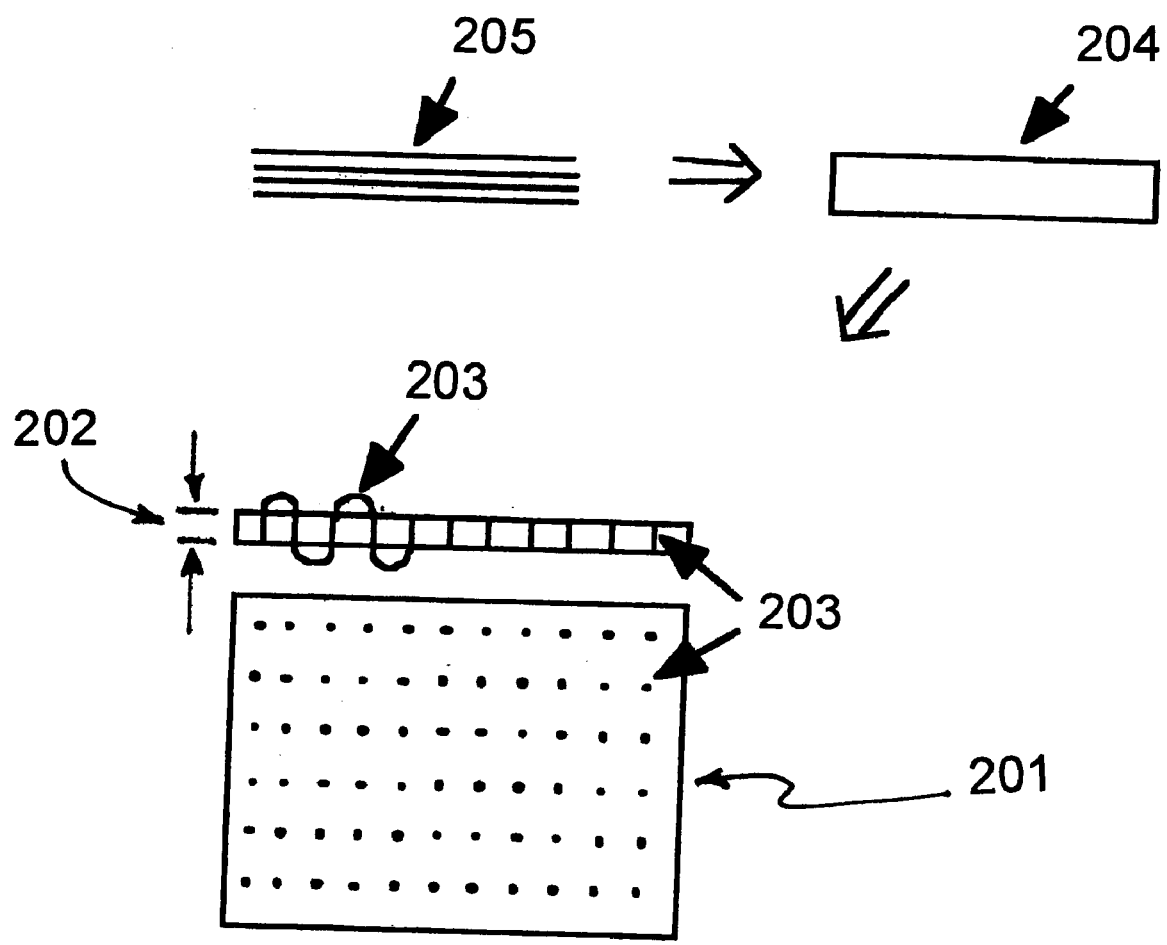
FIG. 2 shows the fiber placement within a composite laminated panel.

The resultant laminate (panel) is composed of layers of graphite-based fibrous material that has been laminated using conventional techniques of "laying up" layers of material (prepregs) that has been pre-impregnated with a suitable plastic resin. Stitching completely through these lamina 205, as shown in FIG. 2, and thermally curing the resultant stitched lamination 204 results in a low cost, thin, high strength, lightweight panel suitable for forming to complex curves. The panel is then used in environments requiring somewhat extended operation, i.e., >3 minutes, at both rapid thermal and high g-force loading. Included as a preferred embodiment of the present invention is an airframe constructed of panels in accordance with the fabrication methods presented herein.

In a preferred embodiment of the present invention, a laminated carbon fiber panel of IM7 fabric layers impregnated with a suitable plastic resin is stitched through its thickness with a glass fiber "thread," thus reinforcing a resultant lamination and providing a medium for improved thermal response therein. Any of the methods for "laying-up" a panel using layers of a composite fabric pre-impregnated with a plastic resin or infiltrated with the plastic resin as layers are built up (as described in the Background for alternate mechanisms), when combined with through-the-laminate stitching using a thermally robust material, contribute to this increased thermal performance. These performance enhancements include:

mechanical strengthening in the transverse direction by bridging at de-lamination zones with the fiber stitching;

thermal distribution through the thickness (rather than just along the length) of the laminate; and facilitated outgassing along the stitch path itself.

Figure 3:
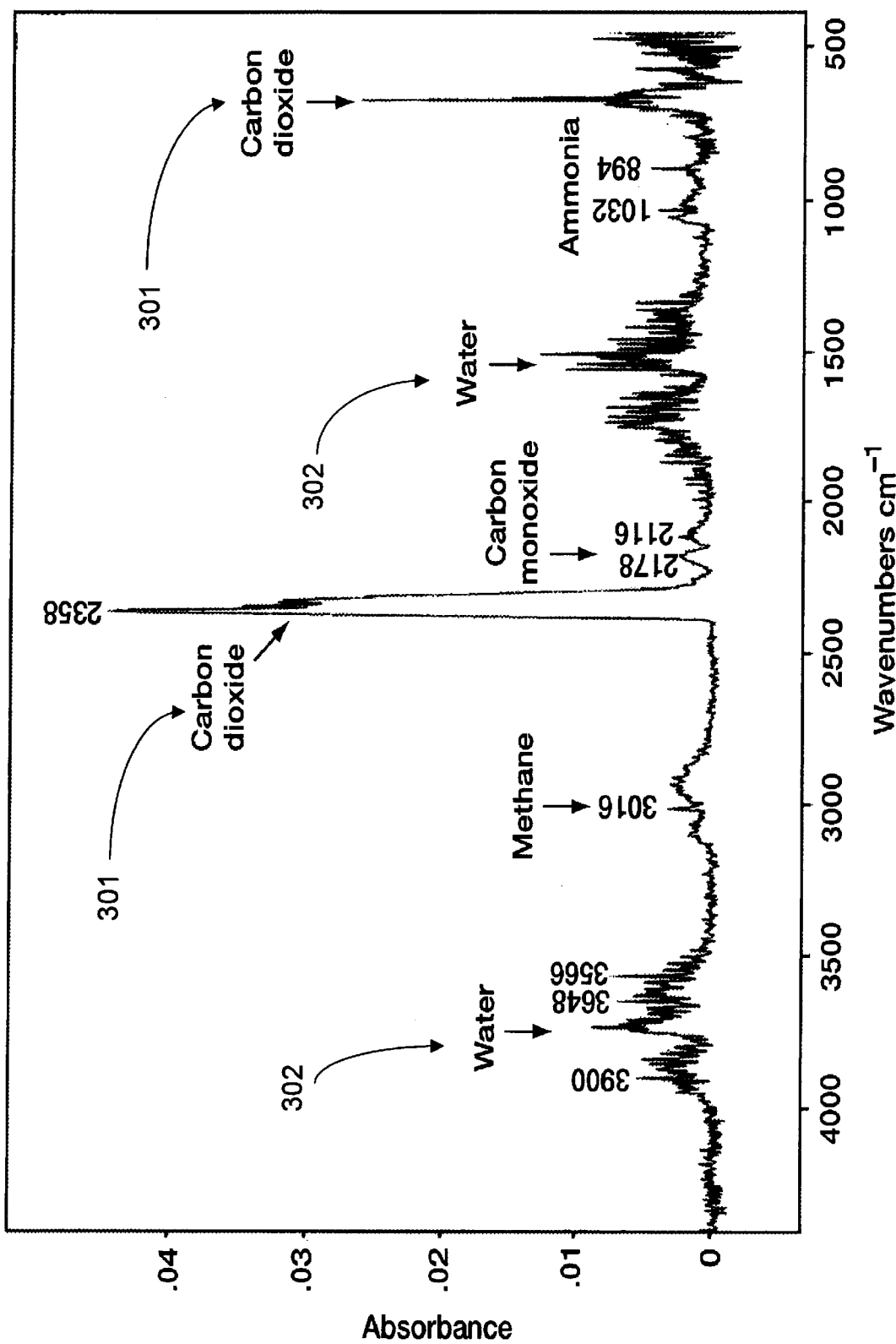
FIG. 3 depicts absorbance versus wavelength for ougasses from a test coupon of the resin-impregnated carbon fiber, IM7.
Figure 4:
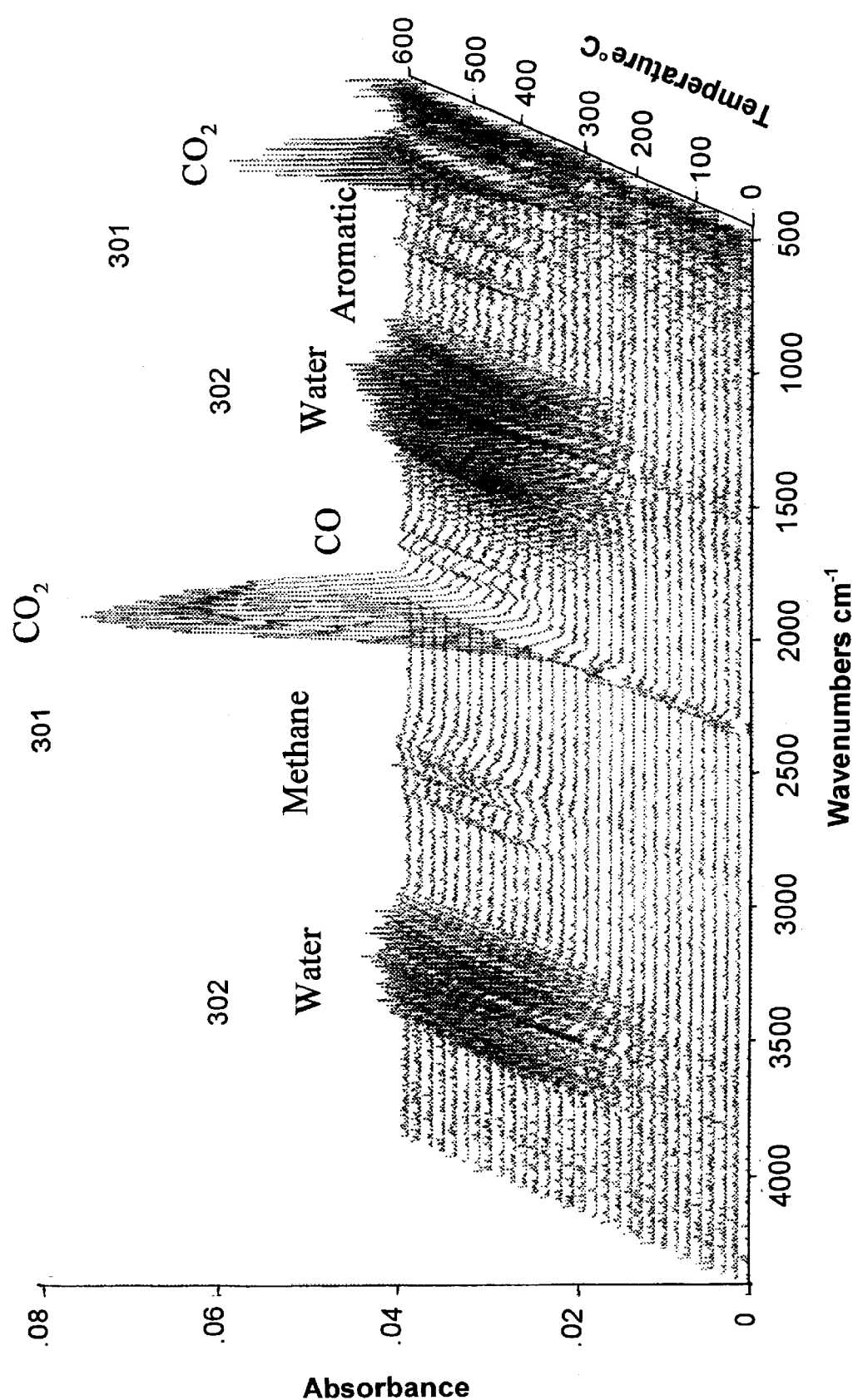
FIG. 4 depicts the 3-dimensional (3D) relationship of absorbance versus wavelength versus temperature for selected outgasses from a test coupon of IM7.
Figure 5:
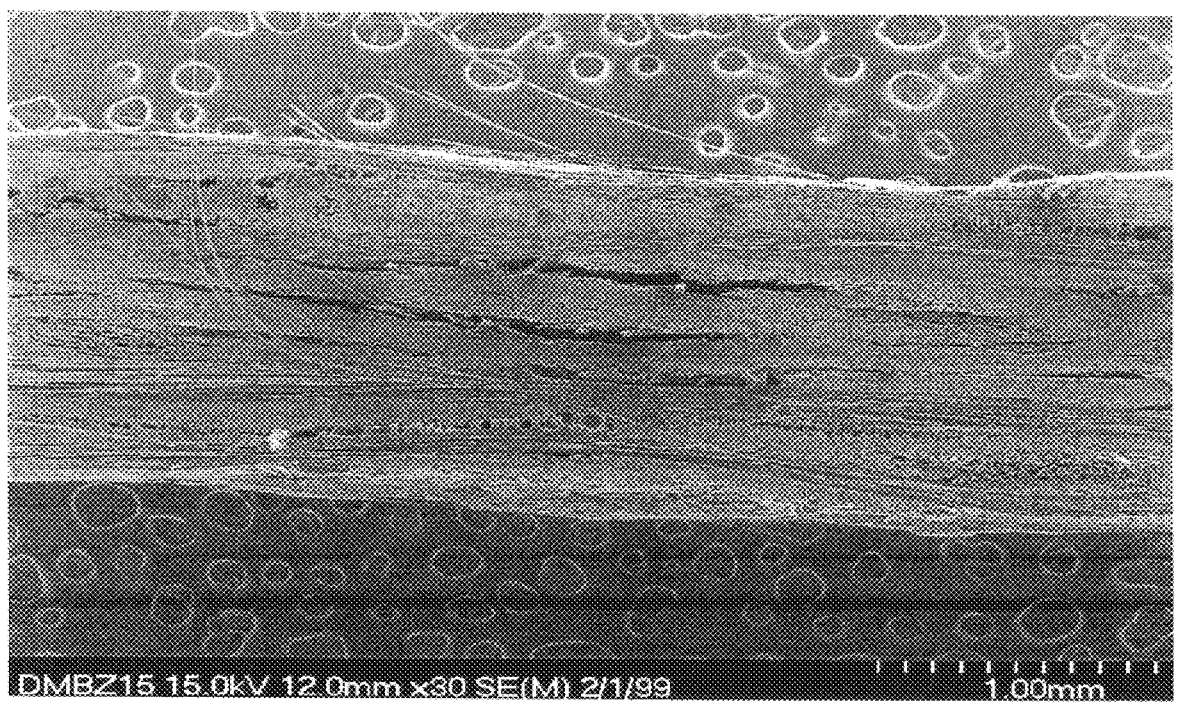
FIG. 5 is a representation of de-lamination of an un-stitched NASA polyimide laminated composite test coupon, DMBZ-15.

FIG. 3 shows that $CO_2$ 301, and to a lesser extent $H_2O$ 302, are major constituents present in the outgasses. FIG. 4 presents another view of the outgassing, showing $H_2O$ 302 to begin outgassing at approximately 390° F. (200° C.) and $CO_2$ 301 at about 750° F. (400° C.).

EXAMPLE

A prepreg comprising AS4 (fabric) is laid-up in layers oriented at either 0°/90° with the length of the laminate or at 0°/±45°/90°, or any combination thereof as required to meet mechanical constraints. Using a suitable industrial heavy duty machine, the layers are then stitched through with a glass fiber in uniform rows of stitching that yield a "matrix" of stitches at approximately 16 stitches per square inch along the entire upper and lower surface of the resultant laminate panel. The matrix material used with the carbon fiber to fabricate the prepreg may consist of 8552 toughened epoxy, 5250 bismaleimide, or DMBZ-15 polyimide and their equivalents in commerce.

The resultant stitched panel is then "cured," using conventional means and processes as would be applied to an "unstitched" panel having the same components. An alternative would be to stitch "dry" carbon fiber cloth layers and impregnate the resultant "mechanically held" laminate with a proper resin prior to curing, typically thermosetting. This latter method avoids the health hazards associated with the dust generated by stitching through layers of prepreg.

The above descriptions should not be construed as limiting the scope of the invention but as mere illustrations of preferred embodiments. For example, although examples discussed at length the application to fabricating the skin of missiles, the method and apparatus is applicable to any that a user may need to address rapid heat "buildup and hold" over short periods of minutes as opposed to hours, with subsequent cool down, in a cost effective way. These include but are not limited to using a lightweight composite material representative of a preferred embodiment of the present invention for non-airborne systems such as supplemental exhaust systems onboard ships or to reduce weight and cost in automotive applications involving short periods of operation. The scope shall be determined by appended claims as interpreted in light of the above specification.

We claim:

1. A structural member that accommodates high rate thermal and G-force loading for a time beyond that moment at which the glass transition temperature, $T_g$, of at least one constituent of said member is reached, comprising:

a composite material having a $T_g$, and three dimensions, wherein one of said three dimensions, termed thickness, is much smaller than either of the other two said three dimensions; and a material compatible with said composite material and suitable for use with a device for penetrating said thickness of said composite material such that said thickness has pass throughs across said thickness, wherein said pass throughs are occupied by stitching said material compatible with said composite material through said pass throughs, wherein multiple layers of said composite material, comprising a lamination, may be penetrated by said stitching of said layers, and wherein said pass throughs provide the member with pathways for outgassing of at least some of its constituent compounds during high rate thermal loading of the member, and wherein said $T_g$ of said composite material is to be at least attained in the normal operation of an apparatus constructed with said member.

2. The member of claim 1 wherein said $T_g$ of said composite material is greater than 0° F.

3. The member of claim 1 wherein said $T_g$ of said composite material is greater than 200° F.

4. The member of claim 1 wherein said $T_g$ of said composite material is greater than 550° F.

5. The member of claim 1 wherein said composite material consists essentially of layers of carbon fibers in a plastic matrix.

6. The member of claim 5 wherein said carbon fiber is IM7 and said plastic matrix is a resin.

7. The member of claim 1 wherein said material compatible with said composite material is a glass fiber.

8. A method of fabricating a structural member which accommodates high rate thermal and G-force loading for a time beyond that moment at which the glass transition temperature, $T_g$, of at least one constituent of said member is reached, wherein said member is provided with pathways for outgassing of at least some of its constituent compounds during high rate thermal and G-force loading of said member, comprising:

providing a composite material having a glass transition temperature, $T_g$, and three dimensions, wherein one of said three dimensions, termed thickness, is much smaller than either of the other two said three dimensions; and providing a material compatible with said composite material and suitable for use with a device for penetrating said thickness of said composite material;

perforating said thickness of said composite material with said device for penetrating thus creating pass throughs in said composite material; and inserting in said pass throughs said material compatible with said composite material, wherein said material compatible with said composite material provides reinforcing stitches across said thickness of said composite material.

9. A panel that accommodates high rate thermal and G-force loading for a moderate period beyond that moment at which constituent parts of said panel's glass transition temperature, $T_g$, is reached, comprising:

composite material having a glass transition temperature, $T_g$, and three dimensions, wherein one of said three dimensions, termed thickness, is much smaller than either of the other two said three dimensions; and a material compatible with said composite material and suitable for use with a device for penetrating said thickness of said composite material such that said thickness has pass throughs therein, wherein said pass throughs are occupied by stitching said material compatible with said composite material through said pass throughs, wherein multiple layers of said composite material, comprising a lamination, may be penetrated by said stitching of said layers, and wherein said pass throughs provide the panel with pathways for outgassing of at least some of its constituent compounds during high thermal loading of the panel, and wherein said $T_g$ of said constituent parts of said panel is at least attained during normal operation of an apparatus constructed with said member.

10. The panel of claim 9 wherein said $T_g$ of said composite material is greater than 0° F.

11. The panel of claim 9 wherein said $T_g$ of said composite material is greater than 200° F.

12. The panel of claim 9 wherein said $T_g$ of said composite material is greater than 550° F.

13. The panel of claim 9 wherein said composite material consists essentially of layers of a carbon fiber in a plastic matrix.

14. The panel of claim 13 wherein said carbon fiber is IM7 and said plastic matrix is a resin.

15. The panel of claim 9 wherein said material compatible with said composite material is a glass fiber.

16. An airframe, having constituent parts, that accommodates high rate thermal and G-force loading for a time beyond that moment at which at least some constituent parts of said airframe's glass transition temperature, $T_g$, is reached, comprising:

a composite material having a $T_g$ and three dimensions, wherein one of said three dimensions, termed thickness, is much smaller than either of the other two said three dimensions; and a material compatible with said composite material and suitable for use with a device for penetrating said thickness of said composite material such that said thickness has pass throughs therein, wherein said pass throughs are occupied by stitching said material compatible with said composite material through said pass throughs, wherein multiple layers of said composite material, comprising a lamination, may be penetrated by said stitching of said layers, and wherein said pass throughs provide the airframe with pathways for outgassing of at least some of its constituent compounds during high rate thermal loading of the airframe, and wherein said $T_g$ of said at least some constituent parts of the airframe is at least attained during normal operation of the airframe.

17. The airframe of claim 16 wherein said $T_g$ of said composite material is greater than 0° F.

18. The airframe of claim 16 wherein said $T_g$ of said composite material is greater than 200° F.

19. The airframe of claim 16 wherein said $T_g$ of said composite material is greater than 550° F.

20. The airframe of claim 16 wherein said composite material consists essentially of layers of a carbon fiber in a plastic matrix.

21. The airframe of claim 20 wherein said carbon fiber is IM7 and said plastic matrix is a resin.

22. The airframe of claim 16 wherein said material compatible with said composite material is glass fiber.

23. A high speed vehicle, having constituent parts, that accommodates high rate thermal and G-force loading for a time beyond that moment at which at least some constituent parts of said high speed vehicle's glass transition temperature, $T_g$, is reached, comprising:

a composite material having a $T_g$ and three dimensions, wherein one of said three dimensions, termed thickness, is much smaller than either of the other two said three dimensions; and a material compatible with said composite material and suitable for use with a device for penetrating said thickness of said composite material such that said thickness has pass throughs therein, wherein said pass throughs are occupied by stitching said material compatible with said composite material through said pass throughs, wherein multiple layers of said composite material, comprising a lamination, may be penetrated by said stitching of said layers, and wherein said pass throughs provide the airframe with pathways for outgassing of at least some of its constituent compounds during high rate thermal loading of the airframe, and wherein said $T_g$ of said at least some constituents of the airframe is at least attained during normal operation of the airframe.

24. The high speed vehicle of claim 23 wherein said $T_g$ of said composite material is greater than 0° F.

25. The high speed vehicle of claim 23 wherein said $T_g$ of said composite material is greater than 200° F.

26. The high speed vehicle of claim 23 wherein said $T_g$ of said composite material is greater than 550° F.

27. The high speed vehicle of claim 23 wherein said composite material consists essentially of layers of a carbon fiber in a plastic matrix.

28. The high-speed vehicle of claim 27 wherein said carbon fiber is IM7 and said plastic matrix is a resin.

29. The high speed vehicle of claim 23 wherein said material compatible with said composite material is glass fiber.

30. The high-speed vehicle of claim 23 in which said high-speed vehicle is a missile.

31. The high-speed vehicle of claim 23 in which said high-speed vehicle is an aircraft.

32. The high-speed vehicle of claim 23 in which said high-speed vehicle is a vehicle suitable for operation in outer space.

* * * * *